US009284069B2

(12) United States Patent
Bigelow

(10) Patent No.: US 9,284,069 B2
(45) Date of Patent: *Mar. 15, 2016

(54) SOLAR GENERATOR TUG

(71) Applicant: Bigelow Aerospace LLC, Las Vegas, NV (US)

(72) Inventor: Robert T. Bigelow, Las Vegas, NV (US)

(73) Assignee: Bigelow Aerospace, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/120,841

(22) Filed: Jul. 2, 2014

(65) Prior Publication Data

US 2015/0008289 A1 Jan. 8, 2015

Related U.S. Application Data

(60) Provisional application No. 61/957,657, filed on Jul. 8, 2013.

(51) Int. Cl.
| *B64G 1/44* | (2006.01) |
| *B64G 1/40* | (2006.01) |
| *B64G 1/64* | (2006.01) |
| *B64G 1/42* | (2006.01) |
| *B64G 1/12* | (2006.01) |
| *B64G 1/22* | (2006.01) |
| *B64G 1/26* | (2006.01) |

(52) U.S. Cl.
CPC ............... *B64G 1/401* (2013.01); *B64G 1/425* (2013.01); *B64G 1/428* (2013.01); *B64G 1/44* (2013.01); *B64G 1/646* (2013.01); *B64G 1/12* (2013.01); *B64G 1/222* (2013.01); *B64G 1/26* (2013.01)

(58) Field of Classification Search
CPC .............. B64G 1/64; B64G 1/22; B64G 1/40; B64G 1/00; B64G 1/646; B64G 1/402; B64G 1/443; B64G 1/401
USPC .......... 244/172.6, 172.4, 171.1, 158.2, 158.1, 244/172.5, 173.3
See application file for complete search history.

(56) References Cited

U.S. PATENT DOCUMENTS

| 3,891,160 | A | * | 6/1975 | Minovitch | ................. | 244/171.1 |
| 4,133,502 | A | * | 1/1979 | Anchutin | ................... | 244/172.6 |
| 4,384,692 | A | * | 5/1983 | Preukschat | ............... | 244/158.1 |
| 4,664,343 | A | * | 5/1987 | Lofts et al. | ................ | 244/171.1 |
| 4,834,325 | A | * | 5/1989 | Faget et al. | ................ | 244/159.4 |
| 4,964,596 | A | * | 10/1990 | Ganssle et al. | ............ | 244/172.5 |
| 5,228,644 | A | * | 7/1993 | Garriott et al. | ............ | 244/172.6 |
| 5,372,340 | A | * | 12/1994 | Ihara et al. | ................ | 244/172.5 |
| 5,429,328 | A | * | 7/1995 | Dobbs et al. | ............... | 244/172.5 |
| 5,511,748 | A | * | 4/1996 | Scott | .......................... | 244/172.5 |
| 5,779,195 | A | * | 7/1998 | Basuthakur et al. | ....... | 244/173.1 |
| 6,017,000 | A | * | 1/2000 | Scott | .......................... | 244/158.6 |
| 6,177,629 | B1 | * | 1/2001 | Katz | ............................. | 136/244 |
| 6,523,784 | B2 | * | 2/2003 | Steinsiek et al. | ........... | 244/172.4 |
| 6,945,500 | B2 | * | 9/2005 | Wingo | ........................ | 244/159.4 |
| 7,207,525 | B2 | * | 4/2007 | Bischof et al. | ............ | 244/172.6 |
| 7,575,200 | B2 | * | 8/2009 | Behrens et al. | ........... | 244/172.3 |
| 7,861,975 | B2 | * | 1/2011 | Behrens et al. | ........... | 244/172.5 |
| 2003/0164428 | A1 | * | 9/2003 | Anderman et al. | .......... | 244/161 |
| 2004/0026571 | A1 | * | 2/2004 | Scott | ........................ | 244/158 R |

(Continued)

*Primary Examiner* — Assres H Woldemaryam
(74) *Attorney, Agent, or Firm* — Franklin E. Gibbs

(57) ABSTRACT

A solar generator tug is disclosed. The tug can dock with spacecraft to provide power for the spacecraft. Further, the tug may dock with other specialty tugs to form a custom transport system.

2 Claims, 1 Drawing Sheet

(56) References Cited

U.S. PATENT DOCUMENTS

| | | | |
|---|---|---|---|
| 2004/0031885 A1* | 2/2004 | D'Ausilio et al. | 244/172 |
| 2004/0245407 A1* | 12/2004 | D'Ausilio et al. | 244/172 |
| 2005/0151022 A1* | 7/2005 | D'Ausilio et al. | 244/172 |
| 2006/0278765 A1* | 12/2006 | Strack et al. | 244/172.4 |
| 2007/0040067 A1* | 2/2007 | D'Ausilio et al. | 244/172.5 |
| 2007/0228220 A1* | 10/2007 | Behrens et al. | 244/172.5 |
| 2008/0121759 A1* | 5/2008 | Behrens et al. | 244/172.3 |

* cited by examiner

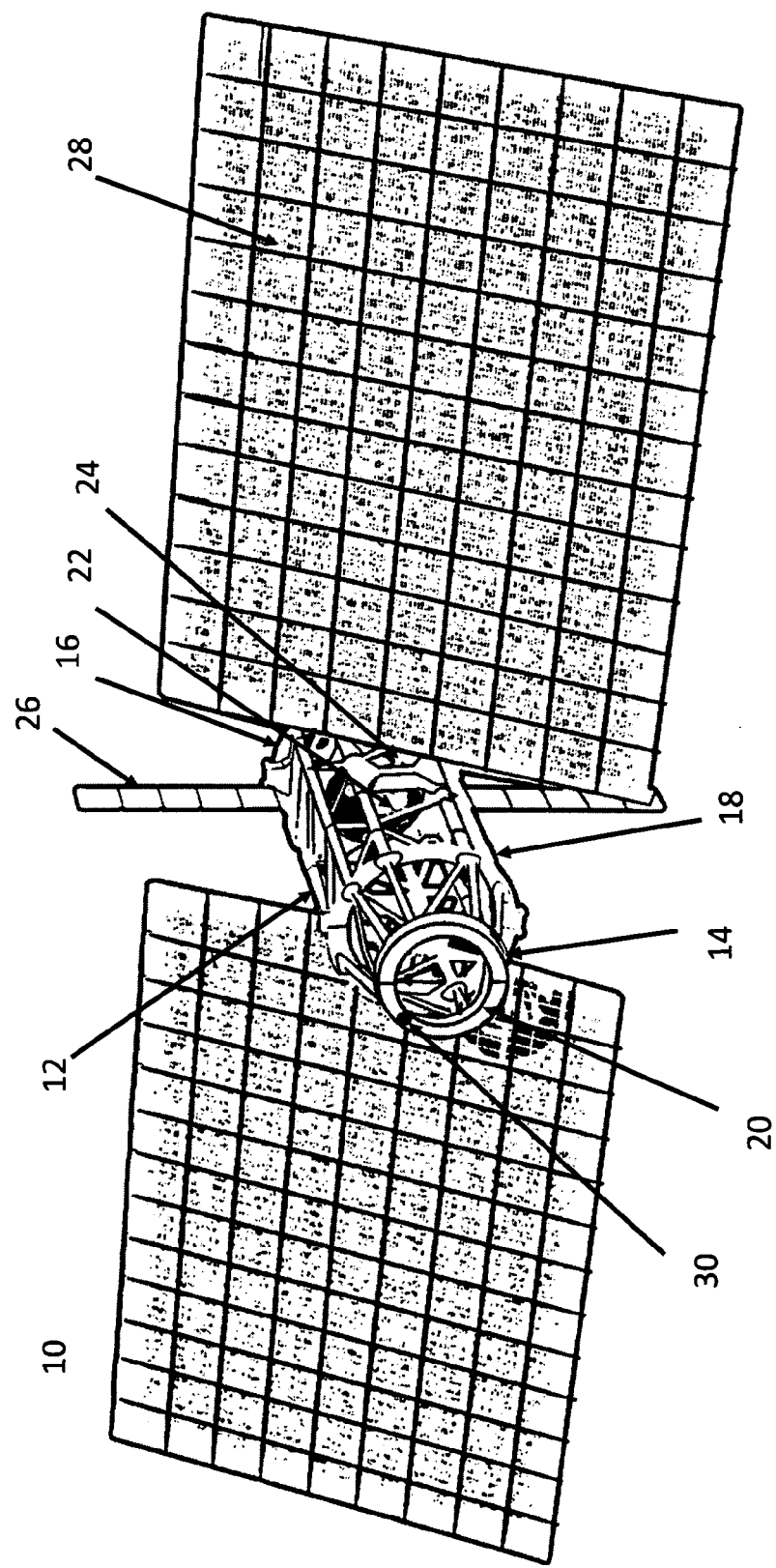

SOLAR GENERATOR TUG

RELATED APPLICATIONS

This application claims priority under 35 U.S.C. §119 to U.S. Provisional Application No. 61/957,657 filed on Jul. 8, 2013, the contents of which are incorporated herein by reference in its entirety.

FIELD OF THE INVENTION

This invention generally relates to space vehicles that can operate as space tugs for providing electrical power to other spacecraft.

BACKGROUND OF THE INVENTION

Space exploration is a rapidly developing field. The types of spacecraft cover a vast range including manned hard shelled space stations, space shuttles, and satellites—to name a few. These crafts usually provide invaluable information and services. However, the fact that these devices are operating in the generally inhospitable environment of space incorporates a unique set of issues. One such issue is a limitation of the amount of power that is available to the craft.

Many spacecraft are deployed with a power system designed to support a particular onboard system requirement. Several reasons may arise that could require an increased power supply. For example, existing power supplies may degrade over time. Solar cells may become damaged or suffer failures. Another example is the possibility of increased power requirements due to more crew members on a spacecraft or experiments that have high power requirements.

What is needed is a solar generator tug to assist in providing more power to a spacecraft. The solar generator tug could also be adaptable to work with other specialty tugs in space.

SUMMARY OF THE INVENTION

A solar generator tug is disclosed. There is a frame having a first and second ends, an outer periphery, and a substantially hollow interior. A docking adapter is disposed on the first and second ends of the frame. There is also a propulsion system comprising fuel, valves, and nozzles for propelling the tug. The nozzles of the propulsion system are disposed on the outer periphery of the frame. To control orientation there is an orienting system comprising fuel, valves, and nozzles for orienting the tug. The nozzles disposed on the outer periphery of the frame.

At least two tug solar cell arrays are disposed on the outer periphery of the frame for providing power to the solar generator tug.

A plurality of generator solar cell arrays are disposed on opposite sides of the outer periphery of the frame and each generator solar cell array having a positioning system such that each array is independently pivotal in relation to the frame and each generator solar cell array capable of being transitioned from a stowed configuration to a deployed configuration and the generator solar cell arrays capable of generating at least ten times the amount of power generated by the tug solar cell arrays.

At least one battery is on the tug and a wireless communications system is connected to the battery.

A computer is connected to the at least one battery, the propulsion system, the orienting system, the positioning system of the generator solar cell arrays, the tug solar cell arrays, and the communications system. The computer controls charging of the batteries by the tug solar cell arrays, directs the operation of the propulsion system and the orienting system, controls the positioning of the generator solar cell arrays, operates the communications system, executes avionics software, provides a status of the tug including the output of the generator solar cell arrays, operates the docking adapters, and implements a three axis attitude control.

In operation, power is provided to the space tug by the tug solar cell arrays and the computer can be accessed through a wireless communications so that the tug can be moved to a desired location in space and attached by way of a docking adapter to another craft and provide power from the generator solar cell arrays to the craft.

BRIEF DESCRIPTION OF THE DRAWINGS

The invention is generally shown by way of reference to the accompanying drawings in which:

FIG. 1 is a perspective side view of the solar generator tug showing the front end of the tug.

DETAILED DESCRIPTION OF THE INVENTION

FIG. 1 perspective side view of one embodiment of a solar generator tug 10. There is a frame 12 having a first end 14 and second end 16, an outer periphery 18, and a substantially hollow interior. There is also a docking adapter 20 disposed on the first and second ends of the frame.

The docking adapter 20 can be generic type of adapter for use with adapters on manned spacecraft. The adapters are also used to connect two tugs together. In this fashion various types of tugs can be connected in series. For example, there could be one solar generator tug connected to a tug that provides propulsion form a series of two tugs. This series could then be docked to a manned spacecraft. The series could provide propulsion and power to the manned spacecraft. However, the invention is not limited to combining only two tugs and can be expanded from a single tug to two tugs to other combinations.

A propulsion system 22 is comprised of tanks that separately contain an oxidizer and a propellant, a valve, and nozzles. In one embodiment, each tank has an access valve for refueling in space. In one embodiment, each tank can be removed and replaced in space. In another embodiment, the tanks may have a measure of protection afforded by meteor shielding disposed over the surface of the tug. The nozzles are disposed on the outer periphery of the frame.

There is an orienting system 24 comprised of fuel and oxidizer tanks, valves, and nozzles. The orienting system is used to orient the position of the tug as in the case where the tug docks with a spacecraft. The nozzles are also disposed on the outer periphery of the frame.

Also present are at least two tug solar cell arrays 26 disposed on the outer periphery of the frame for providing power to the solar generator tug. The tug solar array is used to also charge at least one battery on the tug.

There is a plurality of generator solar cell arrays 28 disposed on opposite sides of the outer periphery of the frame. Each generator solar cell array has a positioning system such that each array is independently pivotal in relation to the frame and each generator solar cell array capable of being transitioned from a stowed configuration to a deployed configuration. In one embodiment, in the stowed configuration the arrays can be folded. The generator solar cell array generates more power than the tug solar array. The generator solar cell arrays are capable of generating at least ten times the amount of power generated by the tug solar cell arrays.

The tug has a wireless communications system connected to the at least one battery, and a computer. The computer is connected to the at least one battery, the propulsion system, the orienting system, the positioning system of the generator solar cell arrays, the tug solar cell arrays, and the communications system. The computer controls charging of the batteries by the tug solar cell arrays, directs the operation of the propulsion system and the orienting system, controls the positioning of the generator solar cell arrays, operates the communications system, executes avionics software, provides a status of the tug including the output of the generator solar cell arrays, operates the docking adapters, and implements a three axis attitude control.

In operation, power is provided to the space tug by the tug solar cell arrays and the computer can be accessed through a wireless communications so that the tug can be moved to a desired location in space and attached by way of a docking adapter to another craft and provide power from the generator solar cell arrays to the craft.

In another embodiment, the tug may include sensing elements 30 to detect the position of a spacecraft and transmitting that information to the operator. The tug could then provide data important to docking with a spacecraft.

In one embodiment, the tug may contain a cable running substantially the length of the tug that could be attached at one end to a manned spacecraft and at the other to another tug such as another solar generator tug to provide more power to the spacecraft. Thus, the power from the solar generator tug could be directed through the cable and to the spacecraft. This flexibility allows the solar generator tug to operate as a building block for use with other specialty tugs to fashion a custom transport vehicle system. The cable could be constructed such that it would be automatically connected and disconnected to other tugs or spacecraft.

In another embodiment, there is a communications and data cable running substantially the length of the tug that could be attached at one end to a manned spacecraft and at the other to another tug such as a solar generator tug to provide data transfer to the spacecraft. The cable could be constructed such that it would be automatically connected and disconnected to other tugs or spacecraft. In another embodiment, there is a control cable with one end attached to the solar generator tug computer and the other end capable of attaching to a spacecraft so that control of the solar generator tug can be controlled from the attached spacecraft.

The tug may be constructed to a variety of scales. For example, in one embodiment a tug may be designed to provide enough power to operate a satellite that may have lost power. In another embodiment, the tug may provide enough power to operate a manned spacecraft.

While embodiments have been described in detail, it should be appreciated that various modifications and/or variations may be made without departing from the scope or spirit of the invention. In this regard it is important to note that practicing the invention is not limited to the applications described herein. Many other applications and/or alterations may be utilized provided that such other applications and/or alterations do not depart from the intended purpose of the invention. Also, features illustrated or described as part of one embodiment may be used in another embodiment to provide yet another embodiment such that the features are not limited to the embodiments described herein. Thus, it is intended that the invention cover all such embodiments and variations. Nothing in this disclosure is intended to limit the scope of the invention in any way.

What is claimed is:

1. A solar generator tug comprising:
   a longitudinal frame having a first and second ends and an inside volume that is in communication with space outside of the longitudinal frame, an outer periphery, and a substantially hollow interior;
   a docking adapter disposed on the first and second ends of the longitudinal frame;
   a propulsion system comprising fuel, valves, and nozzles for propelling the tug and the nozzles disposed on the outer periphery of the longitudinal frame, the fuel residing within the longitudinal frame and the docking adapters at opposing ends of the longitudinal frame and the fuel in between the docking adapters;
   an orienting system comprising fuel, valves, and nozzles for orienting the tug and the nozzles disposed on the outer periphery of the longitudinal frame;
   at least two tug solar cell arrays disposed on the outer periphery of the longitudinal frame for providing power to the solar generator tug;
   a plurality of generator solar cell arrays connected to the outer periphery of the longitudinal frame and disposed on opposite sides of the outer periphery of the longitudinal frame and each generator solar cell array having a positioning system such that each array is independently pivotal in relation to the longitudinal frame and each generator solar cell array capable of being transitioned from a stowed configuration to a deployed configuration and the generator solar cell arrays capable of generating at least ten times the amount of power generated by the tug solar cell arrays;
   at least one battery;
   a wireless communications system connected to the batteries; and
   a computer connected to the at least one battery, the propulsion system, the orienting system, the positioning system of the generator solar cell arrays, the tug solar cell arrays, the wireless communications system, and the computer controls charging of the batteries by the tug solar cell arrays, directs the operation of the propulsion system and the orienting system, controls the positioning of the generator solar cell arrays, operates the communications system, executes avionics software, provides a status of the tug including the output of the generator solar cell arrays, operates the docking adapters, and implements a three axis attitude control; wherein, power is provided to the tug by the tug solar cell arrays and the computer can be accessed through a wireless communications so that the tug can be moved to a desired location in space and attached by way of a docking adapter to another craft and provide power from the generator solar cell arrays to the craft.

2. The solar generator tug of claim 1 further comprising a cable that extends from approximately the length from the first end to the second end and adapted to connect to a tug at one end to a spacecraft at the other end.

* * * * *